(12) United States Patent
Cho

(10) Patent No.: US 8,360,815 B2
(45) Date of Patent: Jan. 29, 2013

(54) ADHESIVE BRASSIERE MANUFACTURED BY USING BARRIER HOLE, AND METHOD OF MANUFACTURING THE SAME

(75) Inventor: Kyu Hak Cho, Seoul (KR)

(73) Assignee: Eves Co, Ltd, Gyeonggi-Do (KR)

(*) Notice: Subject to any disclaimer, the term of this patent is extended or adjusted under 35 U.S.C. 154(b) by 303 days.

(21) Appl. No.: 12/827,322

(22) Filed: Jun. 30, 2010

(65) Prior Publication Data

US 2011/0256801 A1    Oct. 20, 2011

(30) Foreign Application Priority Data

Apr. 19, 2010    (KR) .................. 10-2010-0035710

(51) Int. Cl.
*A41C 3/00*    (2006.01)
(52) U.S. Cl. .............. 450/39; 450/81; 450/92; 450/93
(58) Field of Classification Search .............. 450/39, 450/81, 92, 93
See application file for complete search history.

(56) References Cited

U.S. PATENT DOCUMENTS

| | | | |
|---|---|---|---|
| 7,166,012 B2 | 1/2007 | Lau | |
| 7,766,963 B2 * | 8/2010 | Laghi | 623/7 |
| 2007/0055371 A1 * | 3/2007 | Laghi | 623/7 |
| 2007/0289047 A1 | 12/2007 | Fortner | |
| 2009/0183822 A1 * | 7/2009 | Laghi | 156/245 |
| 2010/0023123 A1 * | 1/2010 | Laghi | 623/7 |
| 2011/0256801 A1 * | 10/2011 | Cho | 450/39 |

FOREIGN PATENT DOCUMENTS

| | | |
|---|---|---|
| KR | 10-911912 | 8/2009 |
| KR | 20-0446876 | 11/2009 |

* cited by examiner

*Primary Examiner* — Gloria Hale
(74) *Attorney, Agent, or Firm* — Robert L. Stearns; Dickinson Wright, PLLC

(57) ABSTRACT

There are provided an adhesive brassiere and a method of manufacturing the same, wherein a molded brassiere cup is manufactured by a computer numerical control (CNC) mold including a barrier hole defining a V-shaped cross section to form a rim around the molded brassiere cup, the molded brassiere cup is finish-cut by a steel cutter on a press, and an adhesive is applied to an inner surface of a molded brassiere cup so that the adhesive brassiere is secured only by the adhesive strength of the adhesive, without any shoulder or back straps, whereby this strapless and backless brassiere has an esthetically excellent appearance and does not cause any skin irritation problems including itching/inflammation/scratching.

11 Claims, 5 Drawing Sheets

(a)

(b)

ADHESIVE BRASSIERE MANUFACTURED BY USING BARRIER HOLE, AND METHOD OF MANUFACTURING THE SAME

CROSS-REFERENCE TO RELATED APPLICATION

This application claims the benefit of Korean Patent Application No. 10-2010-35710, filed Apr. 19, 2010, the disclosure of which is hereby incorporated herein by reference in its entirety.

BACKGROUND OF THE INVENTION

1. Field of the Invention

The present invention relates to an adhesive brassiere and a method of manufacturing the same, and more particularly, to an adhesive brassiere and a method of manufacturing the same, wherein a molded brassiere cup is manufactured by a computer numerical control (CNC) mold including a barrier hole defining a V-shaped cross section to form a rim around the molded brassiere cup and is finish-cut by a steel cutter on a press, and an adhesive is applied to an inner surface of a brassiere cup so that the adhesive brassiere is secured only by the adhesive strength of the adhesive, without any shoulder or back straps, whereby this strapless and backless brassiere has an esthetically excellent appearance and does not cause any skin irritation problems including itching.

2. Description of the Related Art

As the standards of the beauty of a woman have been gradually westernized, the preference to an ample bosom is increasing. Thus, many functional brassieres to enhance the appearance and shape of the breasts have been released. Among the functional brassieres, strapless and backless adhesive brassieres which directly adhere to the breasts, unlike conventional brassieres, are very popular to young women. In an adhesive brassiere, an adhesive layer is formed on an inner surface of each brassiere cup to be in contact with a breast, so that the brassiere is secured to the breasts by the adhesive.

However, conventional adhesive brassieres have problems, such as causing skin troubles by the contact of the adhesive with the skin during use, maintaining the intensity and consistency of the adhesive strength, and finishing an edge of the brassiere cup so as to have an esthetic appearance. Further, it is difficult to produce adhesive brassieres on a mass-production basis which is required to lower the manufacturing unit price to compete with other brassiere products.

To solve the aforementioned problems, Korean Patent No. 911912 discloses a seamless adhesive brassiere and a method of manufacturing the same. In this patent, the seamless adhesive brassiere is manufactured by cutting an edge of a molded brassiere cup by using ultrasonic waves. A foam layer is positioned between an inner fabric and an outer fabric of the molded brassiere cup. However, in this patent, since the edge of the molded brassiere cup is finish-cut by using ultrasonic waves, an end of the foam layer melts by the heat generated when the ultrasonic waves are generated. The melted foam flows into the fabrics positioned at the inner and outer surfaces of the foam layer and hardens, together with the fabrics, causing the hardened fabrics to scratch the skin of a user.

Furthermore, as the brassiere is repeatedly washed, the foam is discolored or oxidized, causing it to crumble and leaving crumbled portions on the skin of the user.

In addition, a conventional brassiere uses a casting mold when manufacturing a molded brassiere cup. Thus, since productivity is low, mass-production is nearly impossible.

Furthermore, since an error inevitably occurs at an edge part of the molded brassiere cup, an ultrasonic cutting or dissociation process is required. In the ultrasonic cutting process, a molded brassiere cup is cut by using heat. Thus, parts of fabrics cut by heat become hard, and moreover, portions of the foam layer melts and flows into the fabrics due to the heat. Consequently, since the edge of the brassiere cup is finished to be unsmooth and irregular, it does not feel good and irritates the skin of the user, causing a scratching feeling. It is also visually unappealing or undesirable.

SUMMARY OF THE INVENTION

Therefore, it is an object of the present invention to provide an adhesive brassiere and a method of manufacturing the same, wherein an edge of a molded brassiere cup manufactured by using a computer numerical control (CNC) mold including a barrier hole, instead of a casting mold, is finish-cut by a steel cutter having a brassiere cup shape on a press. Therefore, even though the brassiere is repeatedly washed and time passes, a foam layer positioned at an edge area of a brassiere cup is not discolored or it is not oxidized, so that the foam layer is not crumbled and thus, the original shape thereof is maintained as it is. Consequently, since the brassiere is secured with the adhesive strength of an adhesive applied to an inner surface of the brassiere cup, it looks nice and has an esthetically excellent appearance. Further, it does not cause any skin irritations or scratches to a user.

In accordance with an embodiment of the present invention, there is provided a method of manufacturing an adhesive brassiere, the method comprising the steps of: forming a molded brassiere cup by bonding fabrics to both surfaces of a foam layer, inserting the bonded fabrics into a CNC mold, and heat-pressing the fabrics inserted in the CNC mold; cutting the molded brassiere cup by positioning the molded brassiere cup on a base of a press, positioning a steel cutter having the same shape as that of a brassiere cup on the molded brassiere cup, and applying a force to the steel cutter to cut the molded brassiere cup; and forming an adhesive layer on the inner surface of molded brassiere cup by spraying/applying a gel having polyolefin as a material into the molded brassiere cup as cut, through a nozzle.

When a pair of molded brassiere cups is not formed in a single unit, the method further comprises a step of connecting the pair of the molded brassiere cups each including the adhesive layer as formed, by using a connection unit.

Preferably, the CNC mold may comprise: an upper mold with a guide pin protruding downwardly; and an under mold with a concave groove (m) and a barrier hole, wherein the concave groove is formed to correspond to the guide pin and a barrier hole is formed along an edge of the brassiere cup.

In accordance with another embodiment of the present invention, there is provided an adhesive brassiere the adhesive brassiere comprising: a molded brassiere cup formed by heat-pressing inner and outer fabrics each bonded to inner and outer surfaces of a foam layer in a CNC (computer numerical control) mold including a barrier hole defining a V-shaped cross section forming a rim around the molded brassiere cup during the heat-pressing and then cut by a steel cutter in the same shape of a brassiere cup to be in a shape in which the inner fabric at an edge of a brassiere cup is curved outwardly; an adhesive layer formed by applying an adhesive to only a partial area of an inner surface of the molded brassiere cup; and a connection unit for connecting a pair of the molded brassiere cups to each other.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE PREFERRED EMBODIMENT

The present invention will now be described more fully hereinafter with reference to the accompanying drawings, in which preferred embodiments of the invention are shown so that those of ordinary skill in the art can easily carry out the present invention.

The present invention relates to an adhesive brassiere which is secured by only the adhesive strength of an adhesive applied to an inner surface of each brassiere cup, without using any shoulder or back straps, and a method of manufacturing the adhesive brassiere. The biggest characteristic of the method of manufacturing the adhesive brassiere according to the present invention is that a molded brassiere cup is formed by a computer numerical control (CNC) mold in which a barrier hole (since they call a 'barrier hole' in the field, the term is used in this application as it is) is formed. Therefore, even though the adhesive brassiere is mass-produced, its shape is always uniform. In addition, since an edge of the brassiere cup is smooth, without any irregularity, and an inner fabric is rounded (i.e., curved) outwardly at the edge of the brassiere cup, no skin irritation, such as itching, is caused on the skin of a user.

The method of manufacturing an adhesive brassiere comprises the steps of: forming a molded brassiere cup by a CNC mold having a barrier hole defining a V-shaped cross section; cutting the molded brassiere cup as formed; and applying an adhesive to an inner surface of the molded brassiere cup as cut. When a pair of the molded brassiere cups is not formed in a single unit, the method further comprises a step of connecting the pair of the molded brassiere cups each having the adhesive layer, by using a connection unit.

All of conventional molded brassiere cups have been formed by a casting mold. Since a casting mold is made by human hands, its precision is low. Specifically, when a molded brassiere cup is formed by a casting mold, an error inevitably occurs at an edge part of the molded brassiere cup. To process the error, dissociation or ultrasonic cutting is required. Therefore, it is basically impossible to mass-produce the adhesive brassieres in the perfectly same shape.

In the present invention to solve the aforementioned problems of the conventional adhesive brassieres manufactured by the casting mold, a molded brassiere cup is formed by using the CNC mold. The CNC mold manufactures the molded brassiere cup through the precise processes of designing the shape, thickness, size and the like of the molded brassiere cup by inputting various data thereof and 3-D scanning the molded brassiere cup.

Figure 4:
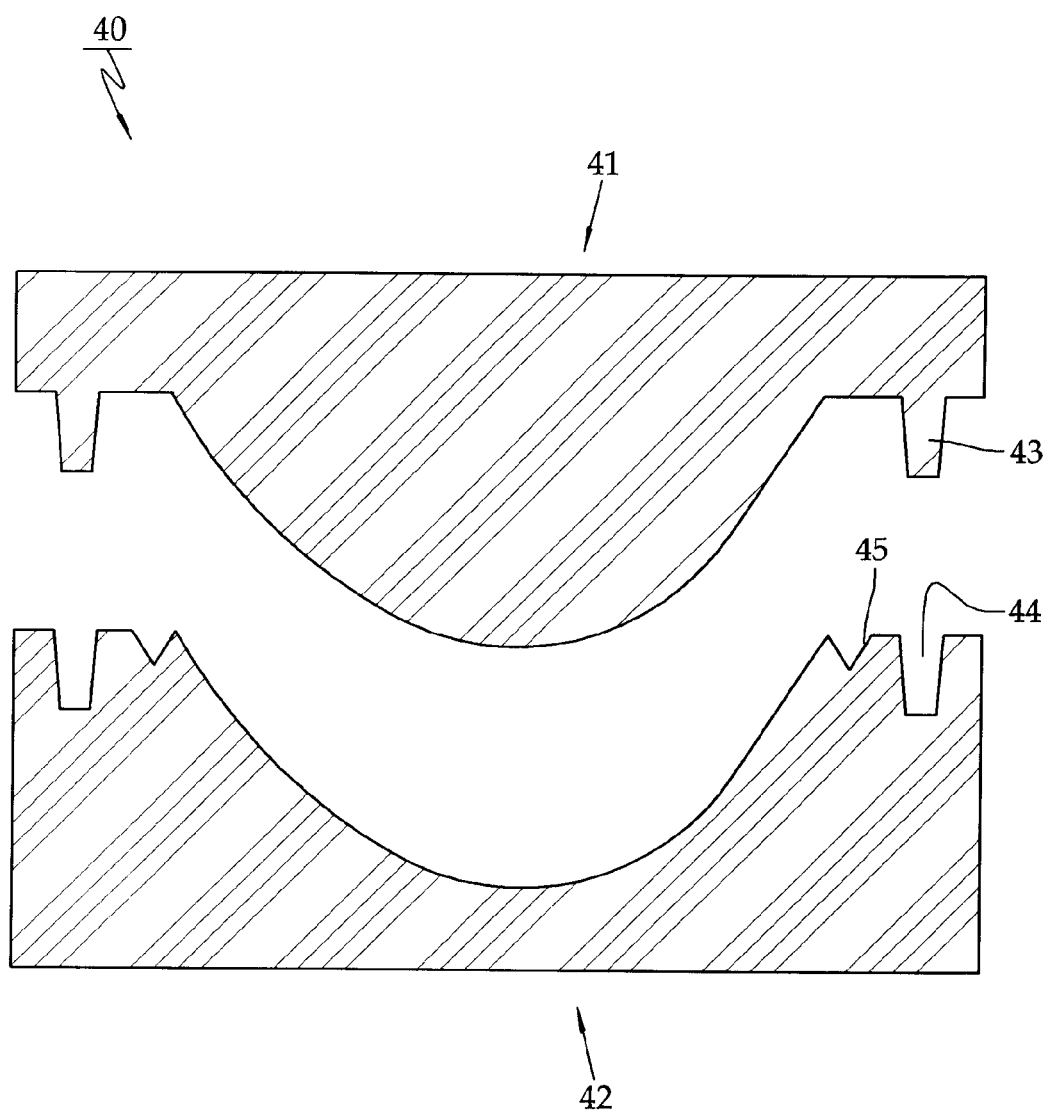
FIG. 4 is a sectional view illustrating a computer numerical control (CNC) mold for forming a molded brassiere cup according to the present invention.

As illustrated in FIG. 4, the biggest characteristic of the CNC mold 40 to form molded brassiere cup according to the present invention is that a barrier hole 45 is formed at an under mold (female mold) 42, along an edge of the molded brassiere cup to be formed. A guide pin 43 is formed to protrude at an upper mold (male mold) 41. A concave groove 44 having the shape of  which corresponds to the shape of the guide pin 43 is formed at the under mold 42. The guide pin 43 and the concave groove 44 guide the upper mold 41 and the under mold 42 to be accurately aligned when the molded brassiere cup is pressed in the CNC mold. Therefore, preferably, the guide pin 43 and the concave groove 44 may be tapered in a vertical direction. The concave groove 44 is formed outside the barrier hole 45. FIG. 4 illustrates the CNC mold to form a single brassiere cup other than a pair of brassiere cups formed in a single unit. However, a pair of brassiere cups in a single unit may be formed by using a single CNC mold although it is not shown.

The step of forming the molded brassiere cup comprises: bonding an inner fabric 11 and an outer fabric 12 to inner and outer surfaces of a foam layer 13, inserting the bonded fabrics into the CNC mold 40, and applying heat of 180-210° C. and pressure of 50-150 ton/cm$^2$ to the fabrics inserted into the CNC mold, for 2-4 minutes, to form the molded brassiere cup. Then, in a process of heat-pressing the upper mold 41 to the under mold 42, a rim 61 in a raised edge shape is formed by the barrier hole 45 formed at the under mold 42. The rim 61 is formed at an area to be the edge of the molded brassiere cup.

When no support members are inserted the brassiere, the foam layer, which is, for example, 12 mm in thickness, may be used in each brassiere cup. However, when a support member 14 is inserted into the each brassiere cup, two sheets of the foam layers, each being 6 mm in thickness, are used and the support member 14 is inserted between the two foam layer sheets. In conventional brassieres, wire rings have been used. However, since the wire rings are hard, they press the breasts of a user and do not properly support up the breasts. However, since the support members 14 used in the present invention are made of plastic and have a flat shape being curved along the shape of the breast, they do not apply any pressure to the breasts. Rather, the support members 14 securely support the shape of the breasts, to push up and lift up the breasts, thereby functionally maintaining the esthetically excellent appearance and shape of the breasts.

Figure 5:
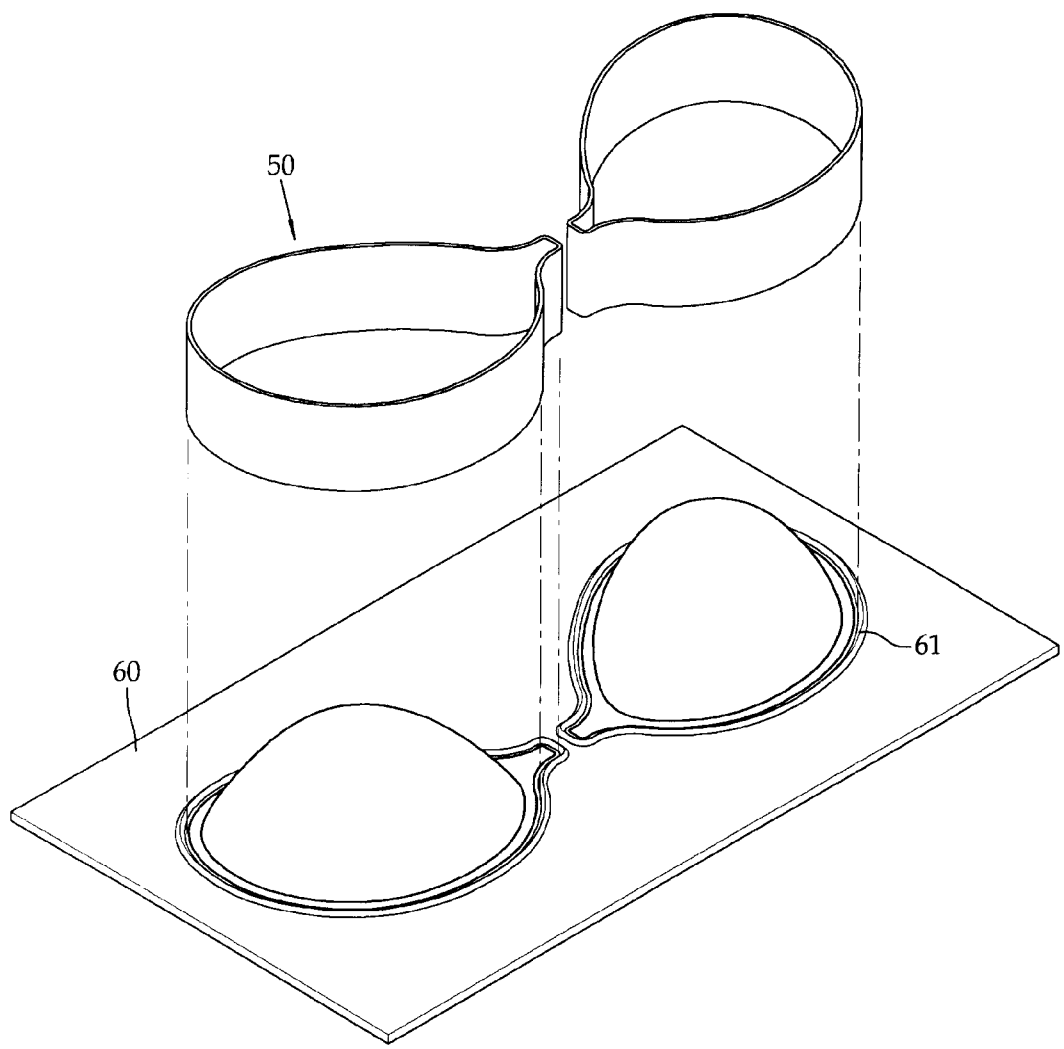
FIG. 5 illustrates the molded brassiere cup formed by using the CNC mold and a steel cutter.

In the step of cutting the molded brassiere cup, after the molded brassiere cup as formed is placed on a base of the press, a steel cutter 50 having the same shape as that of a brassiere cup 10 is positioned on a shaping mold 60. Then, when the steel cutter 50 is pushed down by hydraulically or pneumatically applying a force to the press, the shape of the brassiere cup 10 is cut. The steel cutter 50 needs to be placed to be aligned with an inner line of the rim 61 formed along an edge of the shaping mold 60. As illustrated in FIG. 5, the steel cutter 50 comprises a sharp cutting blade, and a steel band in a band shape. The whole plan view of the steel cutter 50 is the same as that of the brassiere cup 10. As described above, the rim 61 is formed on the shaping mold 60 by the barrier hole 45 formed in the CNC mold, and the steel cutter 50 in the same shape as that of the brassiere cup 10 cuts the molded brassiere cup, along the rim 61. As the result, since the same part is consistently cut, it is possible to mass-produce the brassiere cups in the same shape. Furthermore, since no heat is applied upon cutting the molded brassiere cup, neither the fabrics nor foam layer melt. Therefore, the edge of the brassiere cup 10 is softly and smoothly processed.

In the step of forming an adhesive layer 20 on the inner surface of the molded brassiere cup, a gel having polyolefin as a material is sprayed and applied onto the inner surface of the cut molded brassiere cup, through a nozzle. An adhesive may be applied to the whole area of the inner surface of the molded brassiere cup. However, preferably, it may be applied to only the other area of the inner surface of the molded brassiere cup, except for the area of the inner surface to come in contact with a nipple. This is to prevent the adhesive from coming into contact with the nipple which would result in an uncomfortable feeling plus permit ventilation of the nipple area. A plan shape of the adhesive layer 20 may vary. To apply the adhesive to the inner surface of the molded brassiere cup, a hot melt machine is used. The hot melt machine melts the adhesive to a gel state. The adhesive in the gel state is sprayed through a nozzle, to be applied to the inner surface of the molded brassiere cup. Since the characteristic of the present invention is not in the method of applying the adhesive, no further description will be presented.

Figure 1:
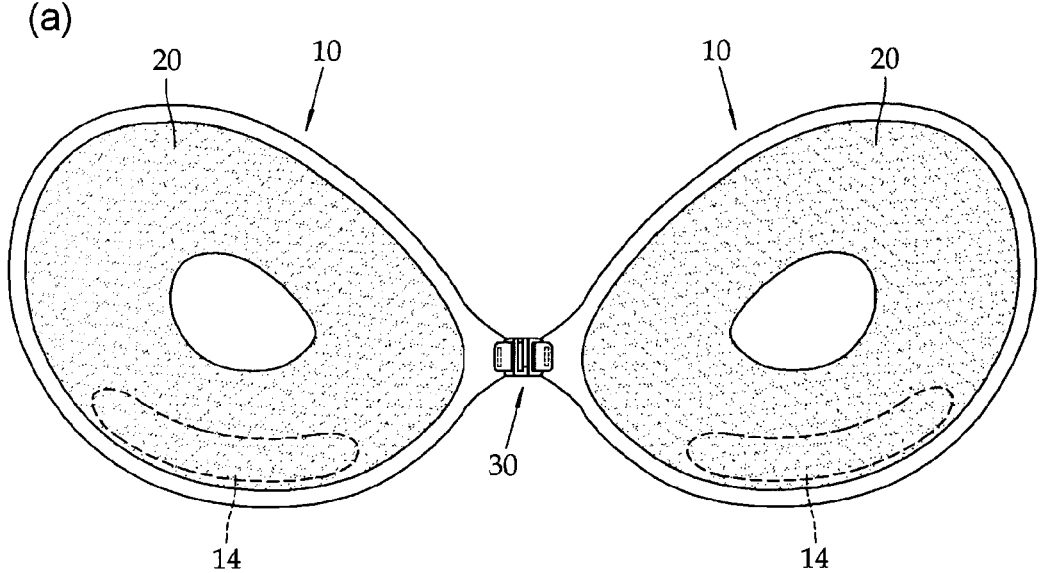
FIG. 1 is a plan view illustrating an inner surface of an adhesive brassiere according to the present invention.
Figure 1:
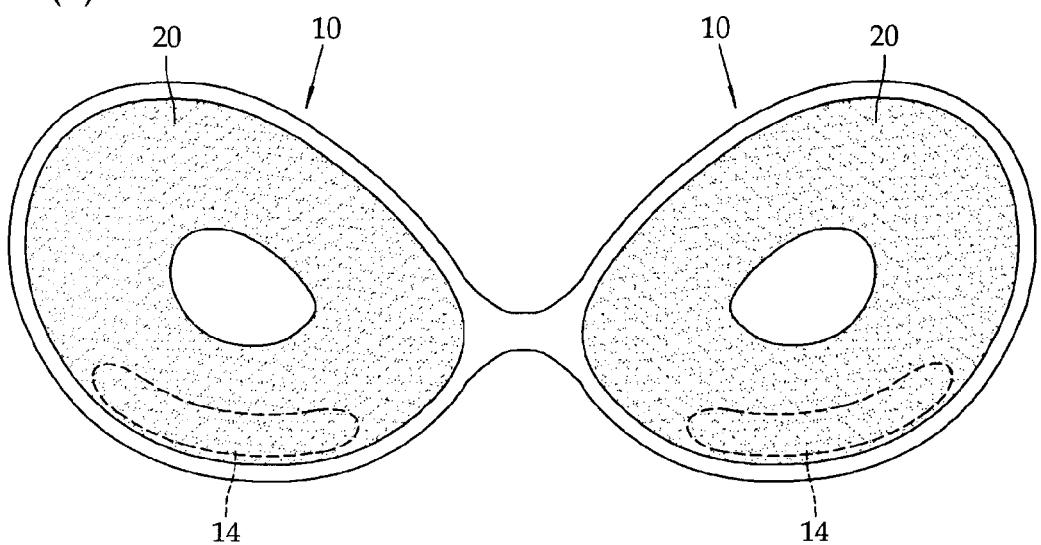
Figure 2:
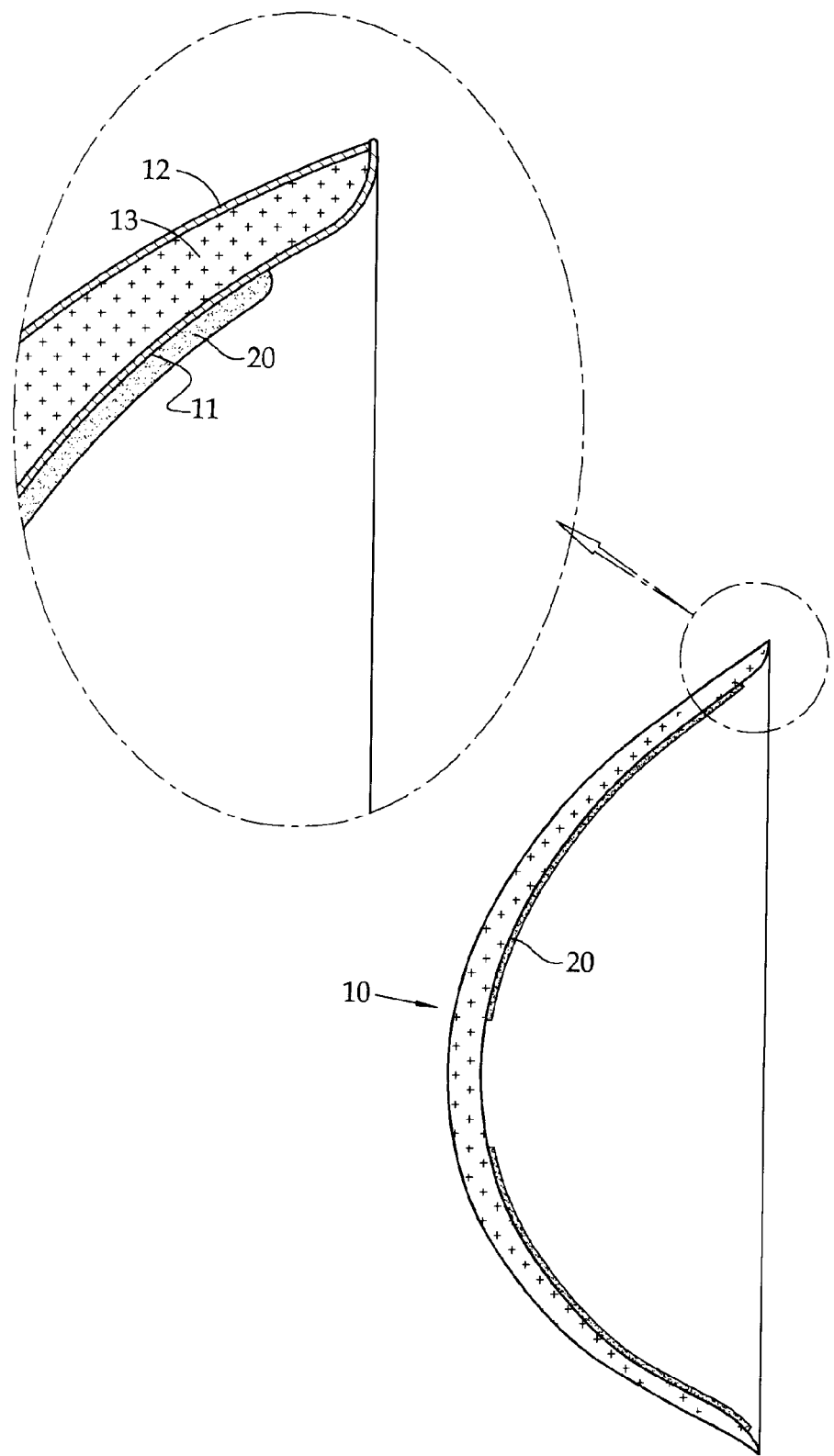
FIG. 2 is a sectional view illustrating of a brassiere cup of an adhesive brassiere and an enlarged sectional view illustrating an end of the brassiere cup.
Figure 3:
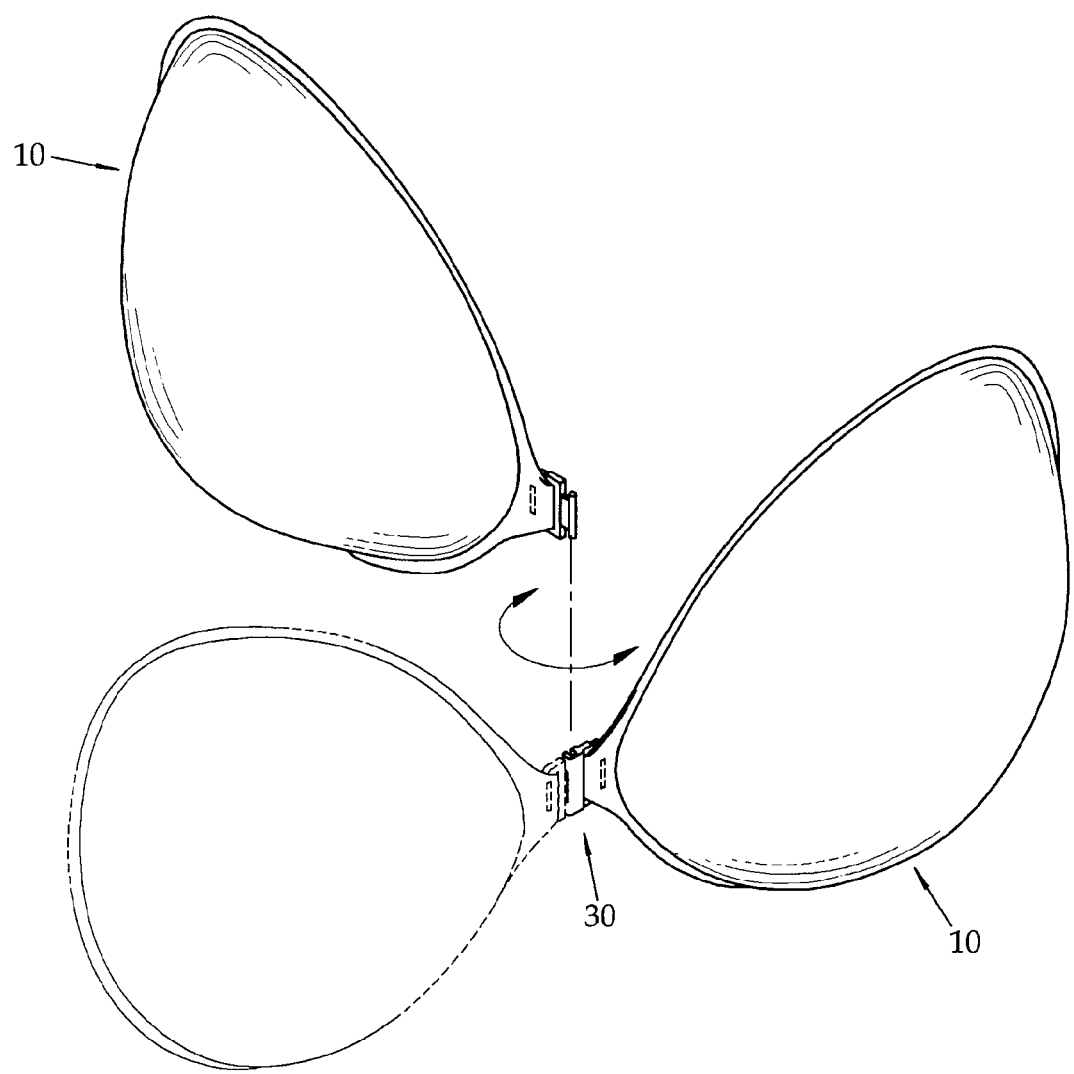
FIG. 3 illustrates an example of a connection unit for connecting the brassiere cups to each other.

After applying the adhesive to the inner surface of the molded brassiere cup, a pair of the molded brassiere cups respectively including the adhesive layer 20 is connected to each other by a connection unit 30. FIG. 3 illustrates an example of the connection unit 30. The connection unit 30 comprises a female connection part attached to one brassiere cup and a male connection part attached to the other brassiere cup. The pair of the brassiere cups is connected is to each other by connecting the female and male connection parts, thereby completing the brassiere. Thus, in addition to the connection unit 30 shown in FIG. 3, any units may be used if they are capable of connecting a pair of the brassiere cups to each other. Of course, no connection unit is needed in the brassiere in which a pair of brassiere cups is formed in a single unit.

The adhesive brassiere comprises: a pair of molded brassiere cups, and an adhesive layer formed on the inner surface of each molded brassiere cup. The adhesive brassiere, in which a pair of brassiere cups is not formed in a single unit, further comprises a connection unit for connecting the brassiere cups to each other. The biggest characteristic of the adhesive brassiere manufactured by the method according to the present invention is that the edge of the brassiere cup is smooth, without any irregularity, and an inner fabric is shaped to be rounded (i.e., curved) outwardly at the edge of the brassiere cup. Therefore, the adhesive brassiere according to the present invention does not cause any skin irritation problems including itching, scratching or inflammation on the skin of the user.

The shaping mold 60 of the brassiere cup comprises the rim 61 in the raised edge shape formed by the barrier hole 45 formed only at the under mold 42 of the CNC mold 40. The rim 61 is formed at the position to be the edge of the brassiere cup (as shown in FIG. 5). After the steel cutter 50 is positioned to be aligned with the inner line of the rim 61 formed along the edge of the shaping mold 60, the press applies the force to the steel cutter 50, to cut the molded brassiere cup. Therefore, the inner fabric is shaped to be rounded (i.e., curved) outwardly at the edge of the molded brassiere cup.

As described above, since a conventional molded brassiere cup is formed by using a casting mold, productivity is low and an error occurs at an edge part of the molded brassiere cup, thereby making it nearly impossible to mass-produce the same products. However, in the present invention, the method of manufacturing an adhesive brassiere by using a barrier hole uses the CNC mold including the barrier hole. Therefore, even if the same molded brassiere cup is formed in large numbers, since the shape of the mold is always consistent, the mass-production thereof is possible. Further, the edge of the molded brassiere cup is smoothly finished. In addition, since the molded brassiere cup is cut by the steel cutter, along the edge line formed by the barrier hole, the same part is consistently cut and therefore, no error occurs and productivity is significantly increased.

In accordance with the present invention, the adhesive brassiere is manufactured by using the barrier hole. For the adhesive brassiere, the molded brassiere cup is manufactured by the CNC mold including the barrier hole, instead of the casting mold, and it is finish-cut by the steel cutter having the same shape as that of the brassiere cup. Thus, the edge of the brassiere cup is smooth, and the inner fabric is shaped to be curved outwardly at the edge of the brassiere cup. Consequently, the adhesive brassiere according to the present invention does not cause any scratching feeling on the skin of a user. Further, since no heat is generated upon cutting, the fabrics are not deformed and portions of the foam layer do not melt and flow into the fabrics positioned at the inner and out surfaces of the foam layer. Thus, even though the adhesive brassiere is repeatedly washed and time passes, since the foam layer at the edge part of the brassiere cup is neither discolored nor oxidized, the foam layer is not crumbled and the original shape of the brassiere cup is maintained.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A method of manufacturing an adhesive brassiere comprising the steps of:
    (a) bonding inner and outer fabrics to inner and outer surfaces of a foam layer,
    (b) inserting the fabrics bonded to the foam layer into a CNC (computer numerical control) mold defining a barrier hole having a V-shaped cross section;
    (c) heat-pressing the fabrics inserted into the CNC mold forming a molded brassiere cup, wherein the barrier hole forms a rim around the molded brassiere cup during heat-pressing;
    (d) cutting the molded brassiere cup by positioning the formed molded brassiere cup on a base of a press, positioning a steel cutter in the same shape as that of the molded brassiere cup on the molded brassiere cup alone an inner line of the rim formed by the barrier hole, and applying a force to the steel cutter, to cut the molded brassiere cup; and
    (e) forming an adhesive layer on an inner surface of the molded brassiere cup as cut by applying a gel having polyolefin as a material to an inner surface of the molded brassiere cup.

2. The method according to claim 1, further comprising the step of connecting a pair of the molded brassiere cups, respectively having the adhesive layer to each other, by using a connection unit.

3. The method according to claim 1, wherein the CNC mold includes an under mold at which the barrier hole is defined in a V-shape shape adapted to form a rim on an edge of the molded brassiere cup.

4. The method according to claim 3, wherein the CNC mold includes an upper mold at which a guide pin protrudes downwardly, and the under mold of the CNC mold includes a concave groove (⊔) formed to correspond to the protruding guide pin.

5. The method according to claim 3, wherein the steel cutter is positioned to be aligned with an inner line of a rim in a raised edge shape formed at the brassiere cup mold by the barrier hole.

6. The method according to claim 1, wherein the step of forming the molded brassiere cup further comprises: the process of inserting a support members in a curved plate into the molded brassiere cup, for pushing up and lifting a breasts when a user uses the adhesive brassiere.

7. The method according to claim 6, wherein the support member is made of plastic.

8. An adhesive brassiere, comprising:
   a molded brassiere cup formed by heat-pressing inner and outer fabric layers bonded to inner and outer surfaces of a foam layer in a CNC (computer numerical control) mold including a barrier hole defining a V-shaped cross section forming a rim around the molded brassiere cup during the heat-pressing and cut by a steel cutter in the same shape of a brassiere cup;
   wherein the inner fabric layer at an edge of the molded brassiere cup is shaped to be curved outwardly away from an inner surface of the inner fabric layer; and
   an adhesive layer formed by applying an adhesive to a partial area of the inner surface of the molded brassiere cup.

9. The adhesive brassiere according to claim 8, wherein a pair of the molded brassiere cups is connected to each other by a connection unit.

10. The adhesive brassiere according to claim 7 or claim 8, wherein the molded brassiere cup comprises: two sheets of the foam layer, and a support member inserted between the two sheets of the foam layer, for pushing up and lifting up breasts when a user uses the adhesive brassiere.

11. The adhesive brassiere according to claim 9, wherein the connection unit comprises: a female connection part and a male connection part being each attached to each molded brassiere cup, for connecting the pair of the molded brassiere cups to each other.

* * * * *